United States Patent
Matsumi (10) Patent No.: US 9,154,658 B2
(45) Date of Patent: Oct. 6, 2015

(54) IMAGE READING APPARATUS DETERMINING EDGE OF ORIGINAL DOCUMENT

(71) Applicant: Takashi Matsumi, Nagoya (JP)

(72) Inventor: Takashi Matsumi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 20 days.

(21) Appl. No.: 13/933,702

(22) Filed: Jul. 2, 2013

(65) Prior Publication Data

US 2014/0009805 A1   Jan. 9, 2014

(30) Foreign Application Priority Data

Jul. 3, 2012   (JP) ................ 2012-149056

(51) Int. Cl.
| | | |
|---|---|---|
| *H04N 1/04* | (2006.01) | |
| *H04N 1/00* | (2006.01) | |
| *H04N 1/047* | (2006.01) | |

(52) U.S. Cl.
CPC ......... *H04N 1/0066* (2013.01); *H04N 1/00702* (2013.01); *H04N 1/00734* (2013.01); *H04N 1/00745* (2013.01); *H04N 1/0473* (2013.01); *H04N 2201/0081* (2013.01); *H04N 2201/04703* (2013.01); *H04N 2201/04786* (2013.01)

(58) Field of Classification Search
CPC .............. H04N 1/00681; H04N 1/193; H04N 2201/00766; H04N 2201/00756; H04N 1/1017; H04N 1/12; H04N 1/0057; H04N 1/121; H04N 2201/00631; H04N 2201/00619

USPC ................ 358/488, 486, 496, 498, 461, 465; 382/318, 319
See application file for complete search history.

(56) References Cited

U.S. PATENT DOCUMENTS

| | | | | |
|---|---|---|---|---|
| 5,130,807 | A  * | 7/1992 | Tanabe et al. ................. | 358/296 |
| 7,130,090 | B2 * | 10/2006 | Reid ............................. | 358/475 |
| 7,327,502 | B2 * | 2/2008 | Sheng .......................... | 358/498 |
| 7,457,012 | B2 * | 11/2008 | Fang ............................ | 358/498 |
| 7,672,025 | B2 * | 3/2010 | Luo .............................. | 358/486 |
| 7,764,408 | B2 * | 7/2010 | Ohama et al. ................. | 358/488 |
| 7,808,680 | B2 * | 10/2010 | Lee .............................. | 358/461 |

(Continued)

FOREIGN PATENT DOCUMENTS

| | | |
|---|---|---|
| JP | 11-266343 A | 9/1999 |
| JP | 2004-120425 A | 4/2004 |

(Continued)

*Primary Examiner* — Cheukfan Lee
(74) *Attorney, Agent, or Firm* — Scully, Scott, Murphy & Presser, PC (57) ABSTRACT

In an image reading apparatus, an image reading unit performs a reading operation to generate image data defined by the reading region. The reading region includes a first region and a second region. The image data includes first data and second data. The first data corresponds to the first region. The second data corresponds to by the second region. The original document passes through the first region and not passes through the second region. A displacing unit displaces the opposing member farther away from the image reading unit when the original document is present in the reading region than a position of the opposing member when the original document is not present in the reading region. A controller determines that an edge reaches the reading position when the second data satisfies a prescribed condition.

11 Claims, 9 Drawing Sheets

(56) References Cited

U.S. PATENT DOCUMENTS

| | | | |
|---|---|---|---|
| 8,068,260 B2* | 11/2011 | Baba | 358/449 |
| 8,427,714 B2* | 4/2013 | Kato et al. | 358/474 |
| 8,542,414 B2* | 9/2013 | Maki | 358/488 |
| 8,665,502 B2* | 3/2014 | Masaki et al. | 358/488 |
| 8,861,040 B2* | 10/2014 | Maeda | 358/449 |
| 2009/0109502 A1* | 4/2009 | Minamino | 358/488 |
| 2011/0085216 A1* | 4/2011 | Noh | 358/498 |
| 2014/0092455 A1* | 4/2014 | Iwatsuka | 358/498 |
| 2014/0211276 A1* | 7/2014 | Kato et al. | 358/488 |

FOREIGN PATENT DOCUMENTS

| | | |
|---|---|---|
| JP | 2008-026713 A | 2/2008 |
| JP | 2010-068410 A | 3/2010 |

* cited by examiner

| TYPE OF ORIGINAL SHEET | COLOR THRESHOLD VALUE |
|---|---|
| NORMAL PAPER | GRAY 1 |
| GLOSSY PAPER | GRAY 2 |
| ⋮ | ⋮ |

FIG.7

IMAGE READING APPARATUS DETERMINING EDGE OF ORIGINAL DOCUMENT

CROSS REFERENCE TO RELATED APPLICATION

This application claims priority from Japanese Patent Application No. 2012-149056 filed Jul. 3, 2012. The entire content of the priority application is incorporated herein by reference.

TECHNICAL FIELD

The present invention relates to a technique for reading an image from an original sheet that moves relative to an image reading unit as the original sheet passes through a read position of the image reading unit, and particularly to a technique for determining the presence of the original sheet at the read position.

BACKGROUND

One type of image-reading device known in the art reads an image from an original sheet moving relative to an image reading unit in the device as the original sheet passes through a read position of the image reading unit. This type of image-reading device determines whether the leading edge or the trailing edge of the original sheet has arrived at the read position, and uses the determination results to set a read timing for the image reading unit, the size of the original image included in the read image, and the like.

One such image-reading device is disclosed in Japanese Patent Application Publication. This image-reading device includes an original-pressing plate disposed opposite the image reading unit. On the original-pressing plate is depicted an identification image, such as a pattern with colors changing in a main scanning direction, a barcode, or a special design. The image-reading device determines that the leading or the trailing edge of the original sheet is at the read position by determining whether the image data read by the image reading unit is data for the identification image or other image data.

SUMMARY

However, in the conventional image reading apparatus described above, the identification image depicted on the original-pressing plate can adversely affect the image read by the image reading unit at the read position. Further, even when an identification image is depicted on the original-pressing plate, the conventional image reading apparatus might incorrectly determine the presence of a leading or trailing edge of the original sheet at the read position if the identification image has deteriorated or become soiled.

In view of the foregoing, it is an object of the present invention to provide an image reading apparatus capable of determining when the leading and trailing edges of the original sheet have arrived at the read position when no identification image is depicted on the original-pressing plate or other member opposing the image reading unit, or capable of preventing incorrect determinations regarding when the leading and trailing edge of the original sheet have arrived at the read position when an identification image is depicted on the opposing member.

In order to attain the above and other objects, the invention provides an image reading apparatus. The image reading apparatus includes a conveying unit, an image reading unit, an opposing member, a displacing unit, and a processor. The conveying unit is configured to convey an original document toward a reading position on a conveying path. The original document includes a leading edge and a trailing edge. The image reading unit has a reading region, and is configured to perform a reading operation while conveying the original document to generate image data representing an image corresponding to the reading region. The reading region extends in a main scanning direction and is positioned at the reading position. The reading region includes a first region and a second region adjacent the first region. The image data includes first data and second data. The first data represents an image corresponding to the first region. The second data represents an image corresponding to the second region. The original document passes through the first region and not passes through the second region. The opposing member opposes the image reading unit and extends over the reading region. The original document passes a space between the image reading unit and the opposing member. The displacing unit is configured to displace the opposing member farther away from the image reading unit when the original document is present in the reading region than a position of the opposing member when the original document is not present in the reading region. The controller is configured to determine that one of the leading edge and the trailing edge reaches the reading position when the second data satisfies a prescribed condition.

According to another aspect, the present invention provides a non-transitory computer-readable storage medium storing computer-readable instructions that, when executed by a controller, causes an image reading apparatus that comprises: a conveying unit configured to convey an original document toward a reading position on a conveying path, the original document including a leading edge and a trailing edge; an image reading unit having a reading region, and configured to perform a reading operation while conveying the original document to generate image data representing an image corresponding to the reading region, the reading region extending in a main scanning direction and being positioned at the reading position, the reading region including a first region and a second region adjacent the first region, the image data including first data and second data, the first data representing an image corresponding to the first region, the second data representing an image corresponding to the second region, the original document passing through the first region and not passing through the second region; an opposing member opposing the image reading unit and extending over the reading region, the original document passing a space between the image reading unit and the opposing member; and a displacing unit configured to displace the opposing member farther away from the image reading unit when the original document is present in the reading region than a position of the opposing member when the original document is not present in the reading region, to perform executing the reading operation while conveying the original document and generating image data representing an image defined by the reading region; and determining that one of the leading edge and the trailing edge reaches the reading position when the second data satisfies a prescribed condition.

DETAILED DESCRIPTION

A scanner according to one embodiment of the present invention will be described while referring to FIGS. 1 through 9. In the following description, the terms "upward", "downward", "upper", "lower", "above", "below", "beneath", "right", "left", "front", "rear" and the like will be used assuming that the scanner 1 is disposed in an orientation in which it is intended to be used. More specifically, the left side of the scanner 1 in FIG. 2 will be referred to as the front side ("F" in the drawings), the near side as the right side ("R" in the drawings), and the top as the upper side ("U" in the drawings).

[Electric Structure of Scanner]

Figure 1:
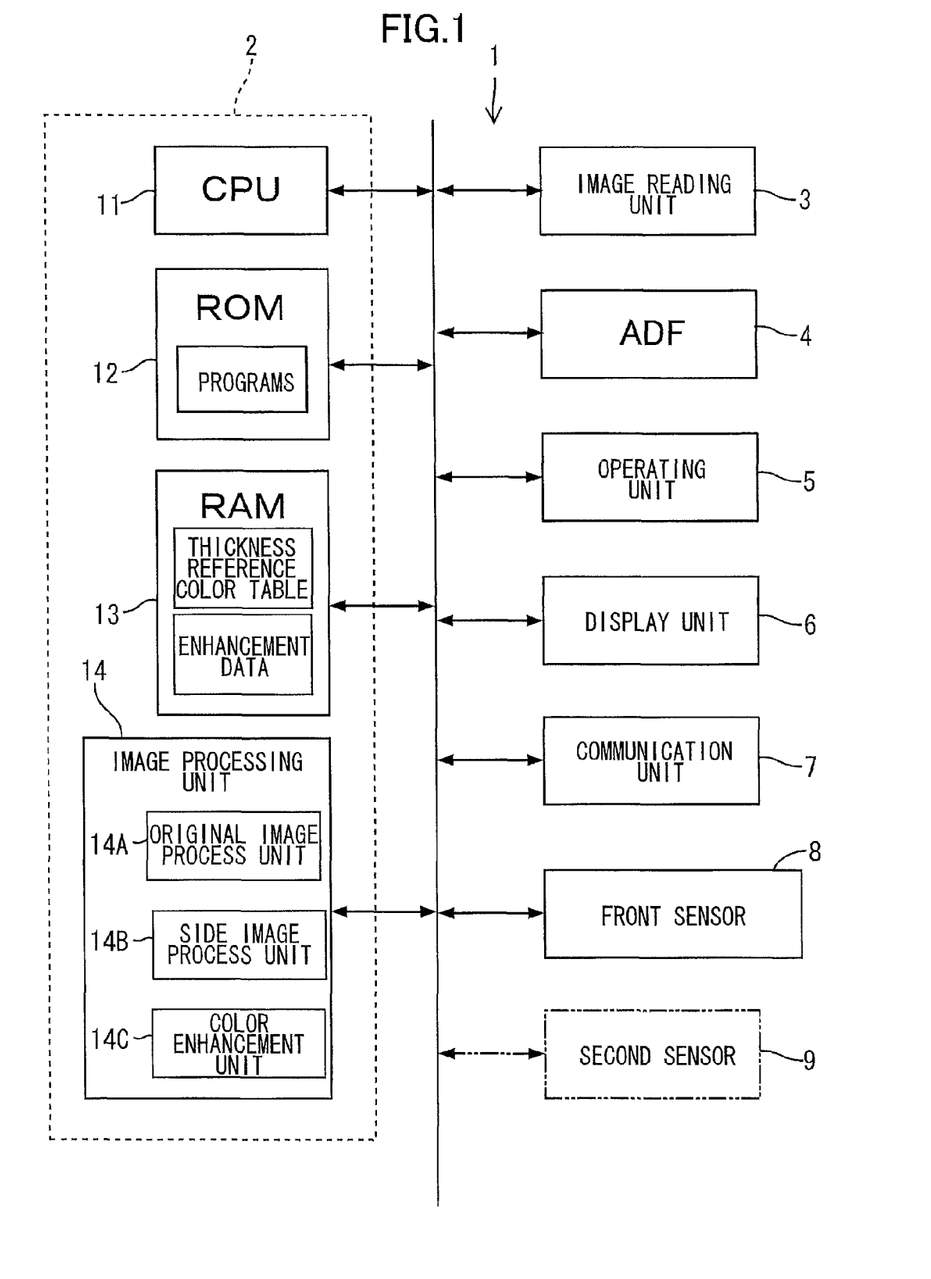
FIG. 1 is a block diagram showing an electrical structure of a scanner according to an embodiment of the present invention.

As shown in FIG. 1, the scanner 1 includes a control unit 2, an image reading unit 3, an automatic document feeder (ADF) 4, an operating unit 5, a display unit 6, a communication unit 7, and a front sensor 8.

The control unit 2 includes a central processing unit (CPU) 11, a ROM 12, a RAM 13, and an image process unit 14. The ROM 12 stores a program for executing a read control process described later, and programs for executing various operations on the scanner 1. The CPU 11 controls the components of the scanner 1 based on programs read from the ROM 12. The various programs mentioned above may be stored on a medium other than the ROM 12, including the RAM 13 and nonvolatile memory such as a CD-ROM, a hard disk drive, or a flash memory (registered trademark).

The RAM 13 stores scan data for an image read by the image reading unit 3. More specifically, the image reading unit 3 produces scan data for rows of pixels based on the scanned image, an A/D conversion unit (not shown) converts this analog data to a digital form, and the image process unit 14 processes the data through shading compensation and the like before the resulting data is stored in the RAM 13. The image process unit 14 is a hardware circuit dedicated to image processing and includes an original-image process unit 14A, a side-image process unit 14B, and a color enhancement unit 14C.

The operating unit 5 includes a plurality of buttons that enable the user to perform various input operations. The display unit 6 has a liquid crystal display, LED lamps, and the like for displaying various option screens and the operating status of the apparatus, for example. The communication unit 7 enables the scanner 1 to exchange scan data and other data with a printer, a personal computer, or other external device through a wired or wireless communication method. The image reading unit 3, the ADF 4, and the front sensor 8 will be described later.

[Structure of Image Reading Unit and ADF]

Figure 2:
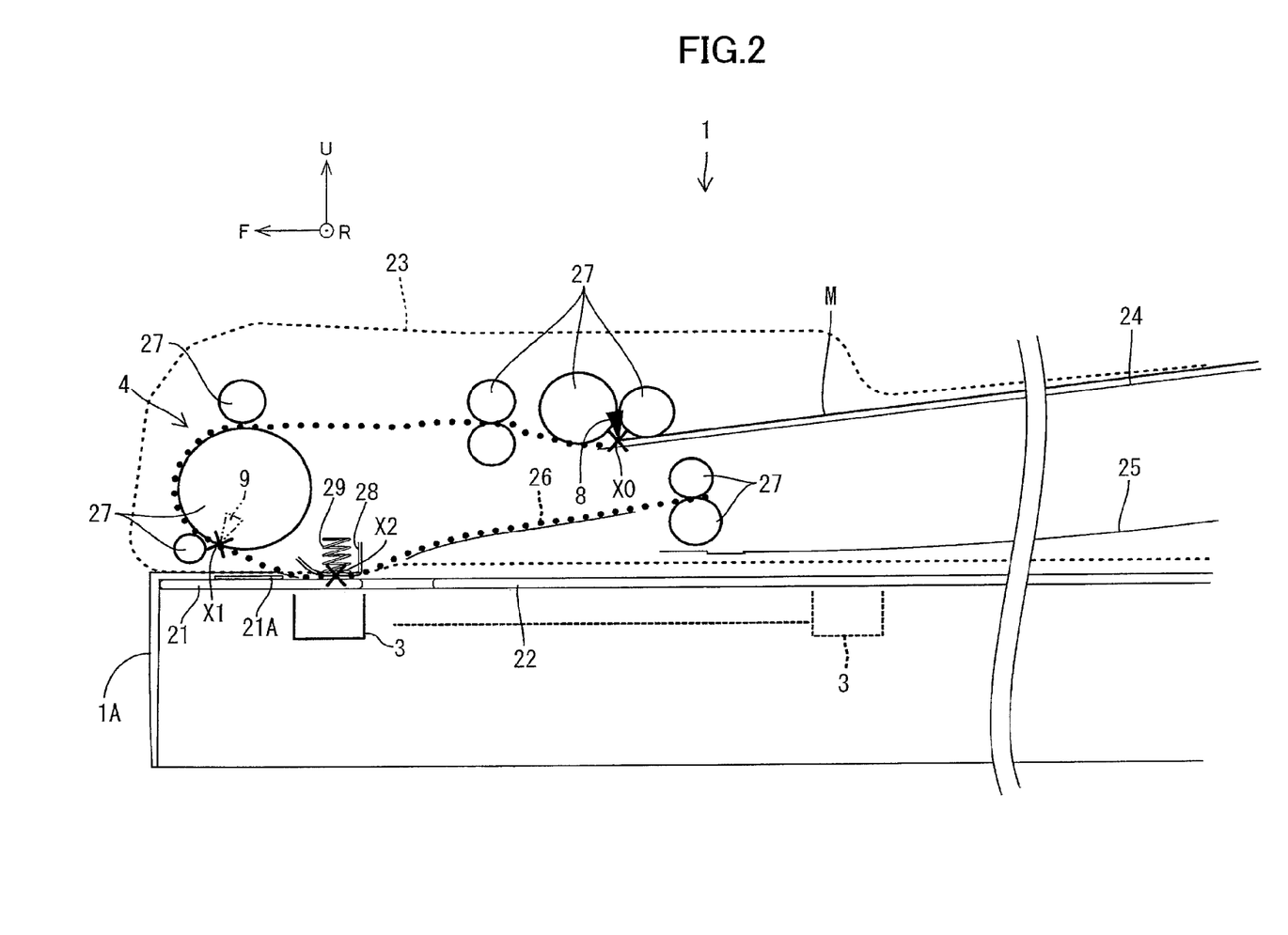
FIG. 2 is a schematic diagram of an image reading unit and an automatic document feeder provided in the scanner of FIG. 1.

As shown in FIG. 2, the scanner 1 has a scanner body 1A. An ADF glass 21 and a flatbed glass 22 are provided on a top surface of the scanner body 1A. A cover 23 is provided on the top surface of the scanner body 1A for covering the ADF glass 21 and the flatbed glass 22 and is capable of opening and closing about one edge of the scanner body 1A. The ADF 4 and the front sensor 8 are provided inside the cover 23, and the image reading unit 3 is provided below the ADF glass 21.

The cover 23 is also provided with an original tray 24 for supporting original sheets M to be scanned, and a discharge tray 25 disposed below the original tray 24 for receiving the original sheets M after the scanning operation. The front sensor 8 is provided on the leading edge side (downstream edge in a conveying direction of the original sheets M) of the original tray 24 at a detection position X0. The front sensor 8 detects the presence of the original sheets M in the original tray 24 and transmits these detection results to the control unit 2.

A conveying path 26 is formed inside the cover 23. The conveying path 26 is generally U-shaped and serves to convey the original sheets M from the original tray 24 to the discharge tray 25. The ADF 4 has a plurality of conveying rollers 27, an original-pressing member 28, and the like disposed along the conveying path 26. The ADF 4 is configured to convey the original sheets M along the conveying path 26 automatically by driving the conveying rollers 27 to rotate. The original-pressing member 28 has an opposing surface 28A (bottom surface) that opposes image reading unit 3, and the opposing surface 28A is white in color. The original-pressing member 28 is fixed via a spring 29 to a prescribed region inside the cover 23 and is displaceable vertically against the urging force of the spring 29.

The image reading unit 3 is a reading device possessing a contact image sensor (CIS). The structure of the image reading unit 3 and its positional relationship to the original-pressing member 28 will be described later in detail. Note that the image reading unit 3 may be configured of a charge coupled drive image sensor (CCD) or the like and is not limited to a CIS. Further, a moving mechanism (not shown) is provided for moving the image reading unit 3 in a front-rear direction beneath the ADF glass 21 and the flatbed glass 22.

The moving mechanism moves the image reading unit 3 to a position directly beneath the original-pressing member 28 for reading an original sheet M conveyed by the ADF 4. The image reading unit 3 reads the original image on the original sheet M and transmits scan data corresponding to the read image to the control unit 2. A read position X2 shown in FIG. 2 is between the original-pressing member 28 and the image reading unit 3 on the conveying path 26 and above the ADF glass 21. The read position X2 denotes the position on the conveying path 26 that the image reading unit 3 reads the original image on the original sheet M conveyed by the ADF 4.

[Detailed Structure of Image Reading Unit]

Figure 3:
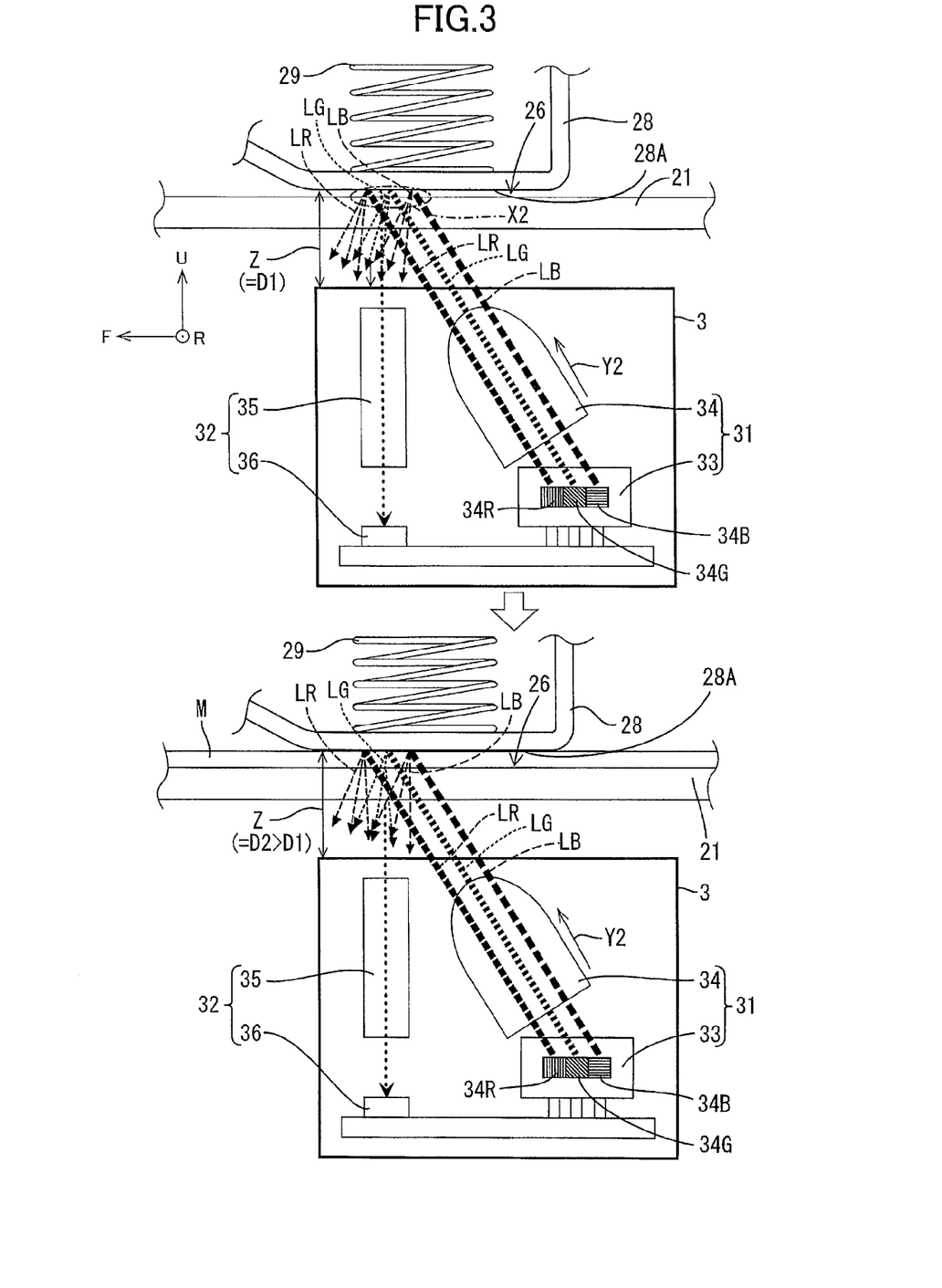
FIG. 3 is explanatory diagrams illustrating different distances between the image reading unit and an original-pressing plate due to displacement of the original-pressing plate.

As shown in FIG. 3, the image reading unit 3 includes a light-emitting unit 31, and a light-receiving unit 32. The image reading unit 3 according to the embodiment is configured such that the light-receiving unit 32 does not receive light reflected specularly off the original-pressing member 28 or the original sheet M, but receives light reflected diffusely. In FIG. 3, light rays LR, LG, and LB for respective colors red (R), green (G), and blue (B) are depicted with different types of lines to aid in distinguishing them, and the range of the read position X2 is exaggerated. In both the top and bottom diagrams of FIG. 3, the light rays LR, LG, and LB of the three colors are shown being reflected off the opposing surface 28A of the original-pressing member 28.

More specifically, the light-emitting unit 31 includes a light-emitting diode (LED) circuit board 33, and a light tube 34. A plurality of red LEDs 34R for emitting the red light ray LR are arranged in the left-right direction. A plurality of green LEDs 34G for emitting the green light ray LG are arranged in the left-right direction. A plurality of blue LEDs 34B for emitting the blue light ray LB are arranged in the left-right direction. That is, each row of the LEDs 34R, 34G, and 34B extends in the left-right direction. As shown in FIG. 3, the red LED 34R, the green LED 34G, and the blue LED 34B are arranged on the LED circuit board 33 and juxtaposed in the front-rear direction (the conveying direction along the conveying path 26). In other words, the row of the LEDs 34R, the row of the green LEDs 34G, and the row of the blue LEDs 34B are juxtaposed in the front-rear direction. The light tube 34 extends in the left-right direction, and is an optical member that serves to guide the light rays LR, LG, and LB from the respective LEDs 34R, 34G, and 34B toward the read position X2. In other words, the light tube 34 guides the light rays LR, LG, and LB in an outgoing direction Y2 that is angled diagonally upward to the front.

The light-receiving unit 32 includes a receiver lens 35, and a light-receiving circuit board 36. The receiver lens 35 is an optical member for guiding light from the side nearest the read position X2 toward the light-receiving circuit board 36. The light-receiving circuit board 36 includes a plurality of light-receiving elements 37 (see FIG. 4) aligned in the left-right direction, which will be called the main scanning direction. The outgoing direction Y2 of the light rays LR, LG, and LB is sloped relative to the direction in which the light-receiving unit 32 opposes the original-pressing member 28 (the vertical direction).

Figure 4:
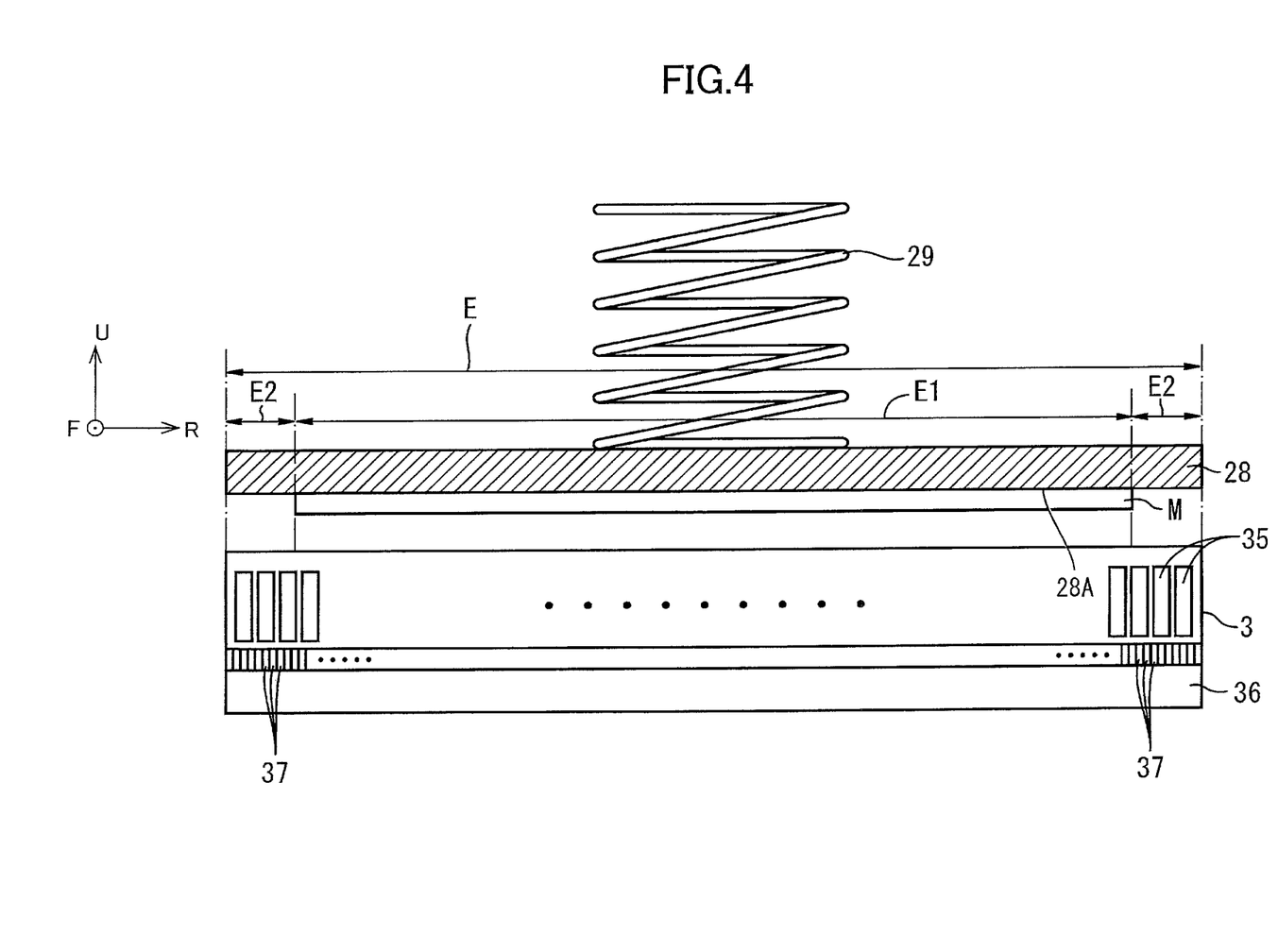
FIG. 4 is a front schematic view of the image reading unit and the original-pressing plate.

FIG. 4 is a front view of the image-reading unit 3 and the original-pressing member 28. The ADF glass 21 and other components have been omitted from the structure in FIG. 4. The reading range E of the image-reading unit 3 extends in the left-right direction at the read position X2 and has a left-right width substantially equivalent to the entire left-right length of all LEDs arranged on the LED circuit board 33. Alternatively, the left-right width of the reading range E may be substantially equivalent to the entire length of the effective LEDs corresponding to the effective pixels used in an image-reading operation. The reading range E also includes a sheet-passing region E1 and side regions E2 juxtaposed in the left-right direction. The sheet-passing region E1 is positioned within the conveying path 26 and denotes the region through which the original sheets M pass. The side regions E2 are positioned on the sides of the sheet-passing region E1 when viewed from the front or from the rear, and denote regions through which the original sheets M do not pass. That is, one side region E2 is adjacent the left end of the passing region E1 and another sider region E2 is adjacent the right end of the passing region E1.

The original-pressing member 28, on the other hand, has a left-right width that is substantially equal to that of the reading range E. Hence, the image-reading unit 3 is capable of reading images within the side regions E2 as well as the sheet-passing region E1. In other words, the image-reading unit 3 can read an image on the opposing surface 28A of the original-pressing member 28 within the side regions E2 whether an original sheet M is present or not present in a gap Z between the original-pressing member 28 and the image-reading unit 3. In the following description, the entire image that the image-reading unit 3 reads within the reading range E will be called the scanned image G, and the image of the original sheet M read in the sheet-passing region E1 will be called an original image G1 while images of the opposing surface 28A of the original-pressing member 28 read in the side regions E2 will be called side images G2 (see FIG. 5).

As described above, the original-pressing member 28 can be displaced vertically through the spring 29. Accordingly, when an original sheet M is present in the gap Z, the original-pressing member 28 is displaced to a position farther away from the image-reading unit 3 than when an original sheet M is not present in the gap Z. Specifically, the gap Z has a length D1 when an original sheet M is not present in the gap Z, as illustrated in the top drawing of FIG. 3. However, the gap Z has a length D2 greater than the length D1 when an original sheet M is present in the gap Z, as illustrated in the bottom drawing of FIG. 3, because the original sheet M pushes the original-pressing member 28 upward against the urging force of the spring 29.

With the above configuration, the image color in the side images G2 is darker when an original sheet M is present in the gap Z than when an original sheet M is not present in the gap Z. The image color in the side images G2 is even darker when a thick original sheet M is present in the gap Z (see FIG. 5). Therefore, reference color data for image colors in the side images G2 is found through experimentation for various types of original sheets M present in the gap Z and pre-stored in the RAM 13 (or the ROM 12), for example. That is, a thickness-reference color table is stored in the RAM 13 (or the ROM 12), and correlates the types (thicknesses) of the original sheet M and corresponding reference color data. The reference color data may be any data specifying reference colors, such as R, G, and B pixel values, or brightness values and color difference values obtained by converting colors in the scan data to the YCbCr or YIQ color space. In the following description, R, G, and B pixel values identifying a reference color will be called an R reference value, a G reference value, and a B reference value.

Figure 6:
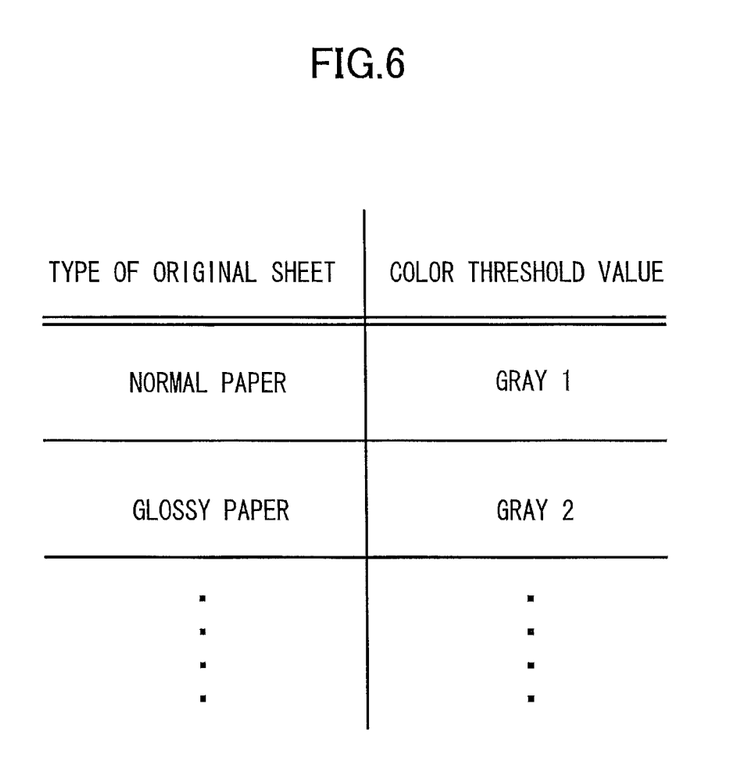
FIG. 6 is a table with data correlating color threshold values and types of original sheets.

Moreover, the RAM 13 (or the ROM 12) stores a table or mathematical expressions correlating color threshold values (reference color data) with types (or thicknesses) of original sheets M. FIG. 6 shows an example of a thickness-reference color table. In this table, Gray 1 is associated with normal paper and Gray 2, which is darker than Gray 1, is associated with glossy paper that is thicker than normal paper.

[Read Control Process]

Figure 7:
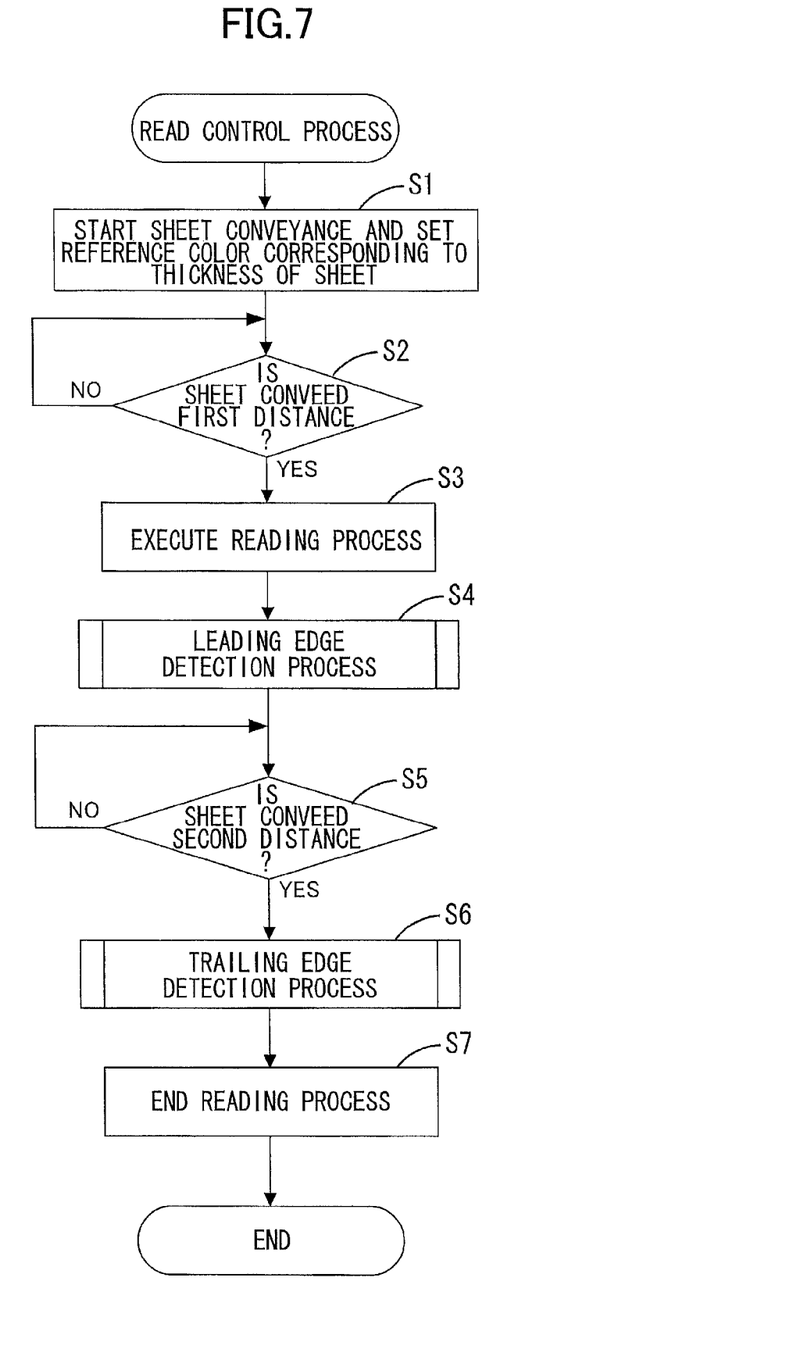
FIG. 7 is a flowchart illustrating steps in a read control process.

If the user performs an operation on the operating unit 5 to activate the read function, for example, the control unit 2 executes the read control process shown in FIG. 7 only after determining that an original sheet M is present in the original tray 24 based on detection results received from the front sensor 8. In the read control process, the control unit 2 determines whether the leading edge or the trailing edge of an original sheet M has arrived at the read position X2 based on whether an image color at acquisition is equivalent to the reference color described above. Here, the image color at acquisition indicates the image color of the side images G2 acquired by the image-reading unit 3 when reading the side regions E2. The user specifies a type of original sheet M (normal paper, glossy paper, thick paper, or the like) by the operating unit 5 when the user activates the read function.

In S1 of the read control process in FIG. 7, the control unit 2 activates the ADF 4 to begin conveying the original sheet M. In the same step, the control unit 2 references the thickness-reference color table stored in the RAM 13 and reads data indicating the reference color corresponding to the type of original sheet M specified by the user on the operating unit 5. That is, the control unit 2 sets the reference color corresponding to the type of original sheet M. In this way, the control unit 2 can adjust the reference color for thicker user-specified original sheets M to a darker color, i.e., a color different from the image color in side images G2 when an original sheet M is not present in the gap Z. In comparison to the conventional method of using a fixed reference color regardless of the thickness of original sheet M, this method can better prevent incorrect detections of edges caused by differences in the thickness of original sheets M.

In S2 the CPU 11 of the control unit 2 determines whether the original sheet M has been conveyed a first distance. Various methods may be used to measure the conveying distance. In one method, the CPU 11 measures the conveying distance by counting the number of steps that a drive motor (not shown) rotates when driving the ADF 4. In another method, the CPU 11 determines the conveying distance based on elapsed time from the starting time of conveyance as measured by an internal timer, and a predetermined conveyance velocity. The first distance is the distance from the detection position X0 to a position X1 upstream of the read position X2.

(1) Reading Process

After determining that the original sheet M has been conveyed the first distance (S2: YES), in S3 the control unit 2 executes a reading process. In this process, the LEDs 34R, 34G, and 34B of the image-reading unit 3 are controlled through time-sharing to emit light in their respective colors, and the image-reading unit 3 outputs scan data covering the entire reading range E for each main scan line. The scan data for each main scan line is converted from analog to digital data and subjected to prescribed processes before being stored sequentially in the RAM 13.

(2) Leading Edge Detection Process

Figure 8:
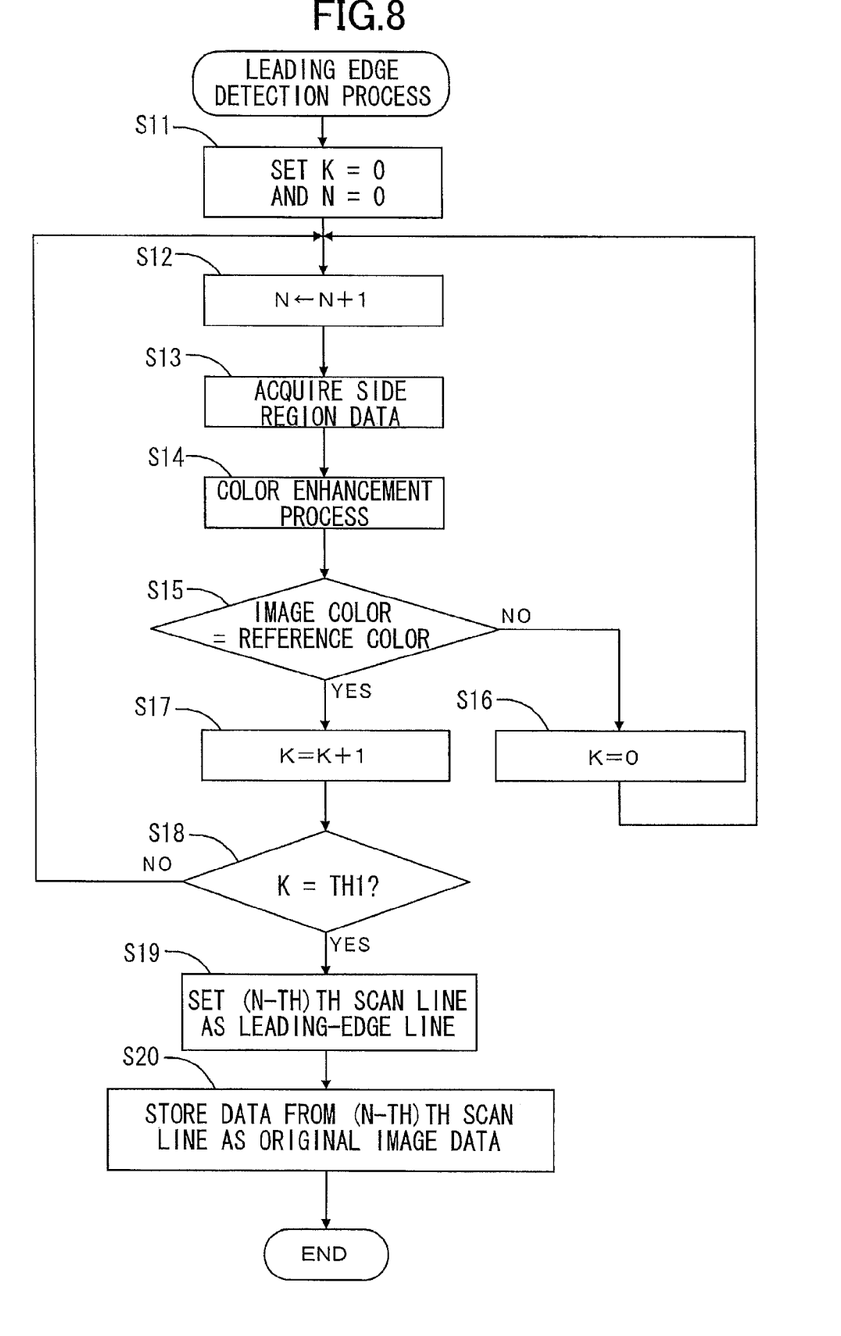
FIG. 8 is a flowchart illustrating steps in a leading edge detection process.

After the control unit 2 starts the reading process, in S4 the control unit 2 executes the leading edge detection process shown in FIG. 8. In S11 at the beginning of this process, the CPU 11 of the control unit 2 initializes a consecutive line number K and a scan line number N to 0. In S12 the CPU 11 increments the scan line number N by 1.

In S13 the image process unit 14 of the control unit 2 executes a data acquisition process for scan data of each of the R, G, and B colors in the $N^{th}$ scan line to acquire side region data, i.e., the scan data in the side regions E2. Specifically, the side-image process unit 14B acquires side region data from the scan data for the scanned image G. The side region data includes pixel values of the R, G, and B colors for all (or some) of the pixels in the side images G2, for example. In parallel with this process executed by the side-image process unit 14B, the original-image process unit 14A acquires scan data in the sheet-passing region E1 (i.e., data for the original image G1) from all scan data in the reading range E and executes shading compensation and other processes on this data.

After executing the data acquisition process, in S14 the image process unit 14 of the control unit 2 executes a color enhancement process on the side region data for the R, G, and B colors in the $N^{th}$ scan line. Specifically, the color enhancement unit 14C generates enhanced color data by referencing enhancement data stored in the RAM 13 and calibrating pixel values that exceed a prescribed value among pixels in the side region data for each color in order to increase the difference between these pixel values and the pixel value for white. The enhancement data stored in the RAM 13 may be configured of a linear correction table based on a linear function, or a gamma correction table.

After completing the color enhancement process, in S15 the control unit 2 executes an original presence determination process for determining whether an original sheet M is present at the read position X2. To make this determination, the control unit 2 determines whether the image color at acquisition is the reference color based on the enhanced color data for the $N^{th}$ scan line. More specifically, the CPU 11 determines that pixels are of the reference color when the red pixel value falls within a prescribed range that includes the R reference value described above, the green pixel value falls within a prescribed range that includes the G reference value, and the blue pixel value falls within a prescribed range that includes the B reference value, for all pixels in the enhanced color data. Next, the CPU 11 determines that the image color at acquisition is the reference color if the number of pixels having the reference color is at least a prescribed percentage (90%, for example) of all pixels in the enhanced color data. Note that the prescribed ranges and the prescribed percentage may be set suitably through experimentation conducted in advance, for example.

The control unit 2 determines that an original sheet M is not present at the read position X2 when the CPU 11 determines that the image color at acquisition is not the reference color (S15: NO). In this case, the control unit 2 resets the consecutive line number K to 0 in S16 and returns to S12. Since the size of the gap Z is the length D1 before the leading edge of the original sheet M reaches the read position X2, the control unit 2 acquires an image color in portions G2F of the side images G2 preceding the leading edge EF of the original image that is brighter, and thus different, than the reference color (see FIG. 5).

When the leading edge of the original sheet M arrives at the read position X2, the size of the gap Z grows from the length D1 to the length D2, causing the image color at acquisition to change temporarily. At this time, the image color in portions G2S of the side images G2 following the leading edge EF of the original image is substantially equivalent to the reference color. Therefore, the control unit 2 determines that the image color at acquisition is the reference color (S15: YES). In S17 the CPU 11 increments the consecutive line number K by 1, and in S18 determines whether the new consecutive line number K has reached a threshold TH1 (3 or 5, for example).

If the control unit 2 determines in S15 that the image color at acquisition is the reference color (S15: YES), but subsequently determines that the image color at acquisition is not the reference color (S15: NO) before the consecutive line number K reaches the threshold TH1 (S18: NO), then the control unit 2 determines that the leading edge of the original sheet M has not arrived at the read position X2 and that a false determination was made due to the effects of noise and the like. Accordingly, in S16 the control unit 2 resets the consecutive line number K to 0 and returns to S12.

When the control unit 2 determines that the consecutive line number K has reached the threshold TH1 (S18: YES), in S19 the control unit 2 sets the $(N-TH1)^{th}$ scan line, obtained by subtracting the threshold TH1 from the current scan line number N, as the leading-edge line. In S20 the original-image process unit 14A of the control unit 2 begins a process to store data of the original image G1 beginning from the $(N-TH1)^{th}$ scan line in the RAM 13 as original image data. Subsequently, the control unit 2 ends the current leading edge detection process and returns to S5 of FIG. 4.

After executing the leading edge detection process, in S5 the control unit 2 determines whether the original sheet M has been conveyed a second distance. To make this determination, the CPU 11 may continue counting the number of scan lines following detection of the leading edge in S4, and may determine that the original sheet M has been conveyed the second distance when the count reaches a prescribed number. Once the control unit 2 determines that the original sheet M has been conveyed the second distance (S5: YES), in S6 the control unit 2 executes the trailing edge detection process shown in FIG. 9. Note that the second distance is shorter than the length of the original sheet M in the conveying direction.

(3) Trailing Edge Detection Process

Figure 9:
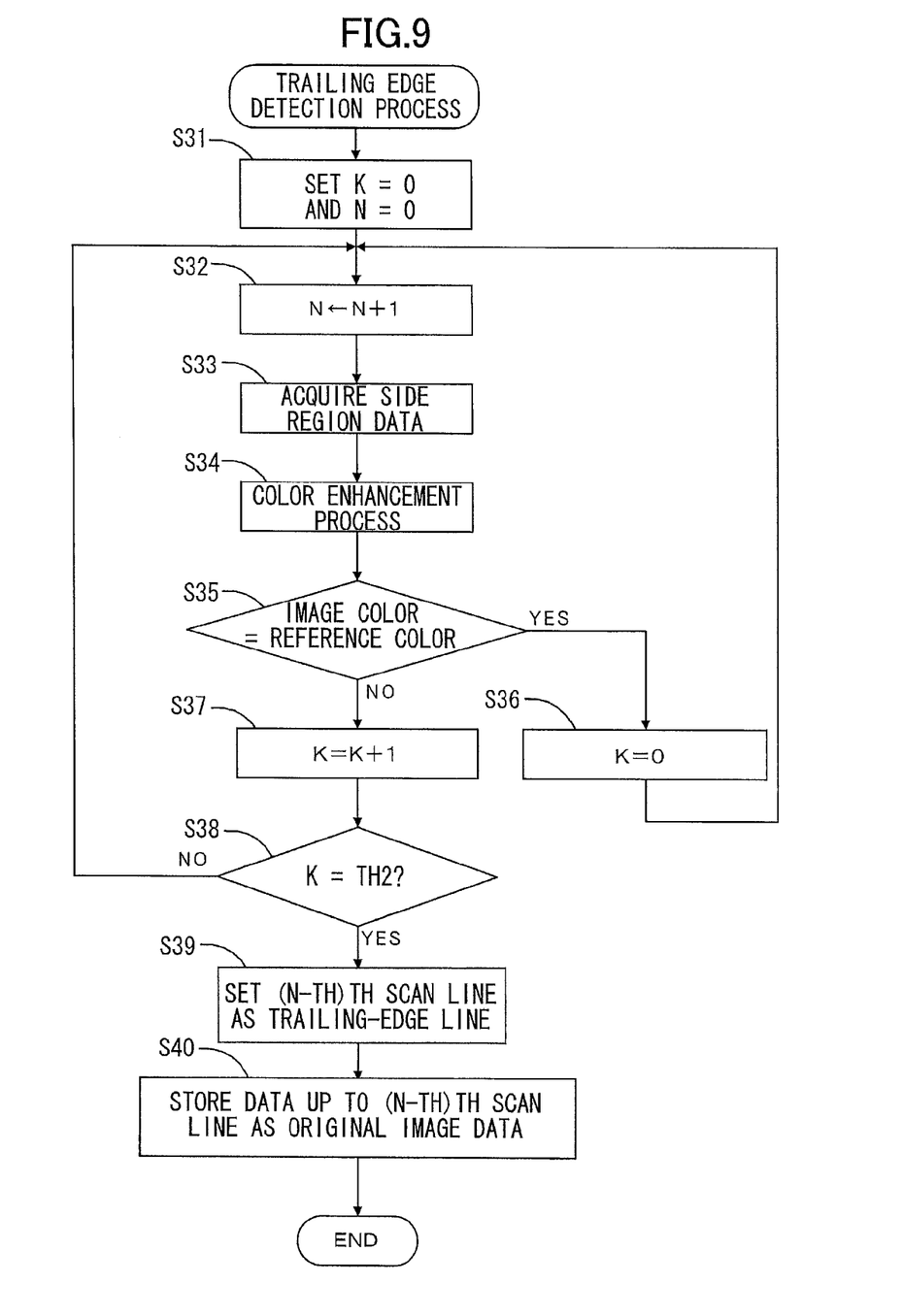
FIG. 9 is a flowchart illustrating steps in a trailing edge detection process.

In S31 the CPU 11 initializes the consecutive line number K and the scan line number N to 0. In S32 the CPU 11 increments the scan line number N by 1, thereby setting the scan line to be read at the beginning of the trailing edge detection process to the first scan line. In S33 the image process unit 14 of the control unit 2 executes the same data acquisition process described in S13 on the red, green, and blue scan data in the $N^{th}$ scan line.

After completing the data acquisition process, in S34 the image process unit 14 of the control unit 2 executes the same color enhancement process described above in S14 on the red, green, and blue side region data in the $N^{th}$ scan line. In S35 the control unit 2 executes the same original presence determination process described above in S15. In this process, the control unit 2 determines whether the image color at acquisition is the reference color based on the enhanced color data for the $N^{th}$ scan line.

If the control unit 2 determines that the image color at acquisition is the reference color (S35: YES), then the control unit 2 determines that the original sheet M is still present at the read position X2. Accordingly, in S36 the control unit 2 resets the consecutive line number K to 0 and returns to S32. Since the gap Z is at the length D2 after the leading edge of the original sheet M reaches the read position X2 and before the trailing edge of the original sheet M passes through the read position X2, the image color at acquisition is the reference color at this time.

Figure 5:
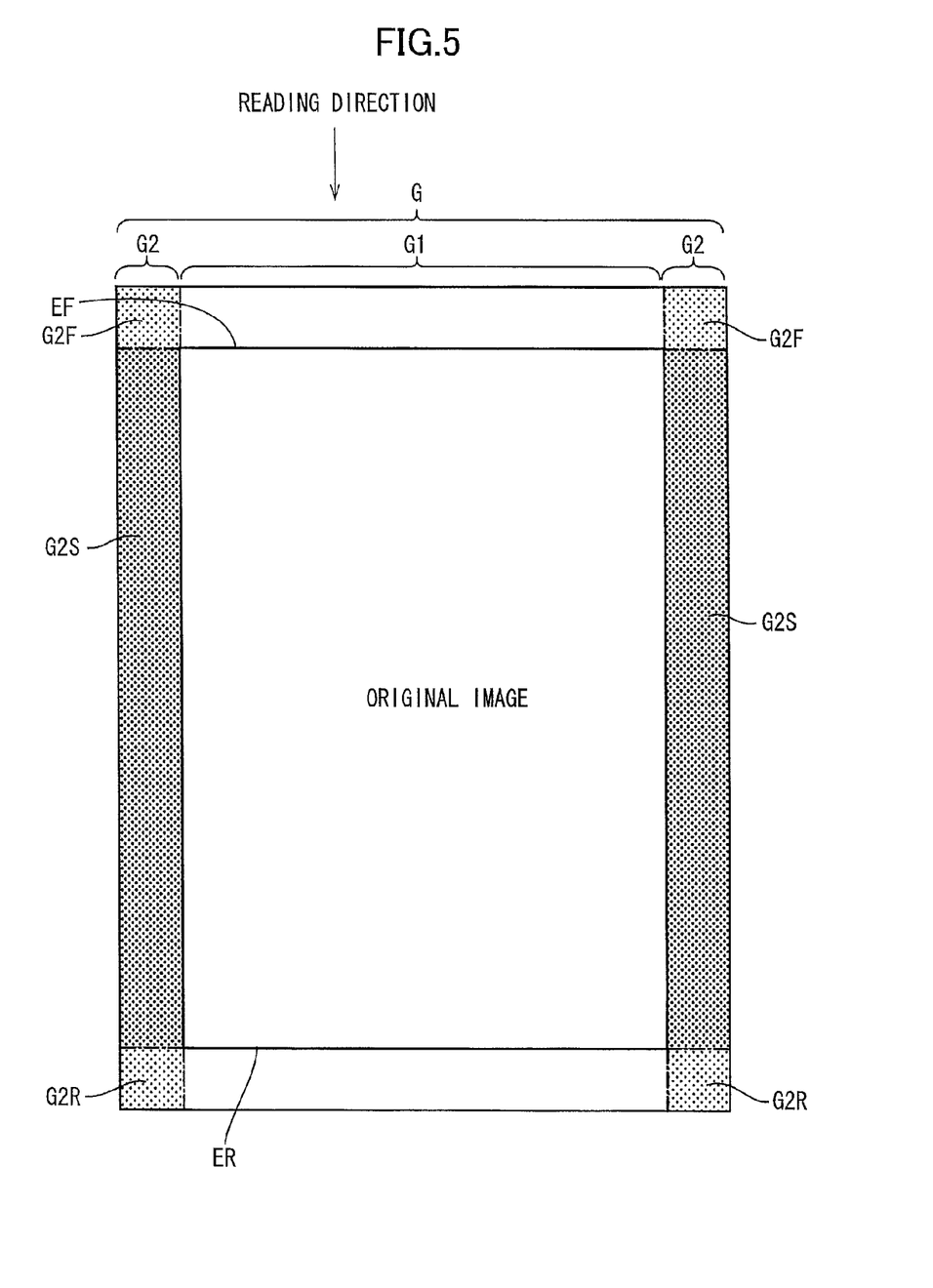
FIG. 5 is an explanatory diagram showing a scanned image including an original image and side images.

However, when the trailing edge of the original sheet M reaches the read position X2, the gap Z returns from the length D2 to the length D1. Consequently, the image color at acquisition temporarily changes. That is, the image color in portions G2R of the side images G2 following the trailing edge ER of the original image differs from the reference color, as illustrated in FIG. 5. As a result, the control unit 2 determines that the image color at acquisition is not the reference color (S35: NO). Hence, in S37 the control unit 2 increments the consecutive line number K by 1. In S38 the control unit 2 determines whether the new consecutive line number K has reached a threshold TH2 (3 or 5, for example). The threshold TH2 may be a different value or the same value as the threshold TH1.

For example, if the control unit 2 determines that the image color at acquisition is not the reference color (S35: NO), but subsequently determines that the image color at acquisition is the reference color (S35: YES) before the consecutive line number K reaches the threshold TH2 (S38: NO), then the CPU 11 determines that the trailing edge of the original sheet M has not reached the read position X2 and that a false determination was made due to the effects of noise or the like. Therefore, in S36 the control unit 2 resets the consecutive line number K to 0 and returns to S32.

When the control unit 2 determines that the consecutive line number K has reached the threshold TH2 (S38: YES), in S39 the control unit 2 sets the $(N-TH2)^{th}$ scan line, obtained by subtracting the threshold TH2 from the current scan line number N, as the trailing-edge line. In S40 the control unit 2 stores all data for the original image G1 up to the $(N-TH2)^{th}$ scan line in the RAM 13 as original image data, thereby ending the current trailing edge detection process.

Upon completing the trailing edge detection process, in S7 of FIG. 7 the control unit 2 ends the reading process, completing the current read control process. Through the above process, scan data from the leading-edge line to the trailing-edge line is stored in the RAM 13 as original image data. In other words, the original image data does not include extra scan data from the start line of the reading process to the leading-edge line or from the trailing-edge line to the end line of the reading process.

Effects of the Embodiment

In the embodiment described above, the reading range E of the image-reading unit 3 includes side regions E2 in addition to the sheet-passing region E1. Further, the original-pressing member 28 is displaced to a position farther from the image-reading unit 3 when an original sheet M is present in the gap Z between the original-pressing member 28 and the image-reading unit 3 than the position of the original-pressing member 28 when an original sheet M is not present in the gap Z. With this arrangement, values of the side region data differ depending on whether an original sheet M is present or not present in the gap Z. The control unit 2 in the embodiment uses these changes in the values of the side region data to detect when an edge of the original sheet M has arrived at the read position X2. In this way, the scanner 1 can determine whether the leading or trailing edge of an original sheet has arrived at the read position without an identification image depicted on the original-pressing member 28 or other opposing member. Alternatively, if the original-pressing member 28 or other opposing member is provided with an identification image, the scanner 1 can suppress incorrect determinations regarding whether the leading or trailing edge of the original sheet has arrived at the read position.

Further, the control unit 2 determines whether edges of the original sheet have arrived at the read position X2 using images within the side regions E2 (i.e., the side images G2) through which the original sheets M do not pass. Accordingly, these determinations are less likely to be influenced by line images or color differences among original sheets M. That is, even if line images such as text are depicted in the original image G1, the control unit 2 is unlikely to mistake such line images as edge images of the original sheet M.

Further, the control unit 2 determines that an edge of the original sheet M has arrived at the read position X2 when there is a change in the image color determined by side region data received from the image-reading unit 3 for each of the R, G, and B light rays. In this way, the control unit 2 can determine with greater precision whether an edge of the original sheet M has arrived at the read position X2 than when using side region data from only one light ray color. The control unit 2 also performs edge determinations using side region data that has undergone color enhancement. Accordingly, the difference in the image color in the side images G2 between when an original sheet M is present at the read position X2 and when the original sheet M is not present at the read position X2 is greater than when edge determinations are made based on unenhanced side region data. Accordingly, this method improves precision in determining the presence of an original sheet.

Variations of the Embodiment

While the invention has been described in detail with reference to specific embodiments thereof, it would be apparent to those skilled in the art that many modifications and variations may be made therein without departing from the scope of the invention defined by the attached claims.

In the embodiment described above, the present invention is applied to a scanner 1 having only a scanner function. However, the present invention may be applied to other image-reading devices, such as a facsimile machine or a multifunction peripheral capable of implementing a plurality of functions including a copier function in addition to a scanner function, for example.

In the embodiment, the control unit 2 is provided with a CPU 11 and an image process unit 14 for executing the read control process. However, the control unit 2 may be configured to execute the read control process with a plurality of CPUs or with only a hardware circuit, such as an application-specific integrated circuit (ASIC). Alternatively, the CPU 11 may be configured to execute one or both of the data acquisition process and the color enhancement process only, for example.

In the embodiment, the scanner 1 is provided with an ADF 4. However, the scanner 1 may be configured as a flatbed-type scanner in which the image-reading unit 3 is moved relative to the original sheet M while the original sheet M remains stationary on the flatbed glass 22.

In the embodiment, the opposing member is an original-pressing member 28 having a white opposing surface 28A. However, the opposing member may be a reference member used for shading compensation, for example. Further, the opposing member need not be white, but may be gray or another color.

In the embodiment, the original-pressing member 28 is displaceable through a spring 29, but the original-pressing member 28 may be displaceable through another elastic member or urging member formed of rubber or the like. Alternatively, a support member may be used in place of the elastic member for supporting the original-pressing member 28 so that the original-pressing member 28 is displaceable in the direction that the original-pressing member 28 opposes the image-reading unit 3. With this configuration, the original-pressing member 28 can still be displaced to a position farther from the image-reading unit 3 when an original sheet M is present in the gap between the original-pressing member 28 and image-reading unit 3 than the position of the original-pressing member 28 when an original sheet M is not present in the gap. Specifically, the weight of the original-pressing member 28 itself brings the original-pressing member 28 toward the image-reading unit 3 when an original sheet M is not present in the gap between the original-pressing member 28 and image-reading unit 3. However, when an original sheet M is present in the gap, the original sheet M pushes the original-pressing member 28 upward against the weight of the original-pressing member 28.

In the embodiment, the original-pressing member 28 is configured to oppose the image-reading unit 3 across the entire reading range E. However, the original-pressing member 28 may be configured to oppose the image-reading unit 3 across the entire sheet-passing region E1 and at least part of the side regions E2.

In the embodiment, reference color data serves as threshold values to determine whether an original sheet M is present in the gap Z, but the threshold values may be pixel values or brightness data for a light ray of one color, for example. In this case, the light-emitting unit 31 is configured to emit a light ray in only one color. Further, the threshold values are not limited to data obtained by scan data for side images when an original sheet M is present in the gap Z (i.e., side region data), but may be data obtained by scan data for side images when an original sheet M is not present in the gap Z. In this case, when the image color at acquisition is the reference color, the control unit 2 determines that the original sheet M is not present, whereas when the image color at acquisition is not the reference color, the control unit 2 determines that the original sheet M is present.

In the embodiment, the type of original sheet M is used as thickness data, but the thickness data may be the thickness of each type of original sheet itself or data identifying the thickness of the original sheets M. Further, while the user inputs the thickness data on the operating unit 5 in the embodiment, the scanner 1 may be provided with a thickness sensor to detect and obtain the thickness of original sheets M in the original tray 24, for example.

In the embodiment, the control unit 2 determines that the trailing edge of the original sheet M has arrived at the read position X2 based on whether the image color at acquisition is the reference color. However, instead of using a reference color, the control unit 2 may determine that an edge of the original sheet has arrived at the read position X2 when the image color at acquisition has changed. For example, after beginning the reading process in S3 of FIG. 7, the control unit 2 determines that the leading edge of the original sheet M has arrived at the read position X2 when the image color at acquisition changes initially. Further, the control unit 2 determines that the trailing edge of the original sheet M has arrived at the read position X2 when the image color at acquisition changes initially after determining that the original sheet M has been conveyed the second distance (S5: YES). Note that the control unit 2 uses the side images G2 to determine whether the edges of the original sheets have arrived at the read position X2. Accordingly, even if text or other line images are depicted in the original image G1, the control unit 2 is unlikely to mistake these line images as images of an edge of the original sheet M.

In the embodiment, the light-emitting unit 31 of the image-reading unit 3 is disposed downstream of the light-receiving unit 32 in the conveying direction. However, the light-emitting unit 31 may be disposed upstream of the light-receiving unit 32 instead. Further, the outgoing direction of the light rays LR, LG, and LB need not be parallel to one another, provided that the image color at acquisition is different depending on whether the original sheet M is present or not present in the gap Z.

A second sensor 9 may also be provided in the scanner 1, as indicated by double chain lines in FIGS. 1 and 2. The second sensor 9 is disposed at the detection position X1 upstream of the read position X2. With this configuration, the control unit 2 can determine whether the original sheet M has been conveyed the first distance when the second sensor 9 turns on.

In the edge detection processes of the embodiment (S4 and S6), the control unit 2 performs a color enhancement process on the side region data. However, rather than performing color enhancement on the side region data, the control unit 2 may simply execute the process to determine the presence of an original (S15 and S35) on the unprocessed data. However, the color enhancement process performed in the embodiment increases the difference in the image color at acquisition depending on whether the original sheet M is present in or absent from the gap Z, enabling the control unit 2 to determine the presence of the original sheet M with greater accuracy.

In the embodiment, the control unit 2 determines whether an edge of the original sheet M has arrived at the read position X2 based on whether the image color at acquisition is the reference color. However, the control unit 2 may determine simply whether the original sheet M is present at the read position X2 based on whether the image color at acquisition is the reference color. This configuration can be used in paper jam related processes to determine whether the jammed original sheet M is present at the read position X2 when a paper jam occurs or to determine that a paper jam has occurred when the presence of the original sheet M has been detected continuously for more than a prescribed time, for example.

What is claimed is:

1. An image reading apparatus comprising:
a conveying unit configured to convey an original document toward a reading position on a conveying path, the original document including a leading edge and a trailing edge;
an image reading unit having a reading region, and configured to perform a reading operation while conveying the original document to generate image data representing an image corresponding to the reading region, the reading region extending in a main scanning direction and being positioned at the reading position, the reading region including a first region and a second region adjacent to the first region, the image data including first data and second data, the first data representing an image corresponding to the first region, the second data representing an image corresponding to the second region, the original document passing through the first region and not passing through the second region;
an opposing member opposing the image reading unit and extending over the reading region, the original document passing a space between the image reading unit and the opposing member;
a displacing unit configured to displace the opposing member farther away from the image reading unit when the original document is present in the reading region than a position of the opposing member when the original document is not present in the reading region; and
a controller configured to determine that one of the leading edge and the trailing edge reaches the reading position when the second data satisfies a prescribed condition.

2. The image reading apparatus according to claim 1, wherein the second data includes an image value,
wherein the controller determines that the one of the leading edge and the trailing edge reaches the reading position when a currently acquired image value is changed from a previously acquired image value.

3. The image reading apparatus according to claim 2, further comprising a storing unit storing a threshold value,
wherein the controller determines that the one of the leading edge and the trailing edge reaches the reading position when the image value is changed to the threshold value from a value not equal to the threshold value.

4. The image reading apparatus according to claim 2, further comprising a storing unit storing a threshold value,
wherein the controller determines that the one of the leading edge and the trailing edge reaches the reading position when the image value is changed from the threshold value to a value not equal to the threshold value.

5. The image reading apparatus according to claim 2, further comprising:
a storing unit storing a plurality of threshold values; and
a thickness acquiring unit configured to acquire a thickness of the original document,
wherein the controller sets a threshold value from among the plurality of threshold values such that the thicker the thickness is, the more a difference between the threshold value and a reference value increases,
wherein the controller determines whether the currently acquired image value is changed from the previously acquired image value based on the threshold value.

6. The image reading apparatus according to claim 5, wherein the reference value indicates the image value when the document is not present in the reading region.

7. The image reading apparatus according to claim 2, wherein the controller performs a color enhancement process to correct the image value such that a difference between the corrected image value and a predetermined value is larger than a difference between the image value and the predetermined value,
wherein the controller determines that the one of the leading edge and the trailing edge reaches the reading position when the currently acquired corrected image value is changed from the previously acquired corrected image value.

8. The image reading apparatus according to claim 1, wherein the controller controls the image reading unit to start to read the original document in the image reading unit and to acquire the image data before the original document reaches the reading position.

9. The image reading apparatus according to claim 1, wherein the image reading unit includes:
a light emitting unit configured to emit light of a plurality of colors; and
a light receiving unit configured to receive at least part of light emitted from the light emitting unit, the image data being produced based on the received light, the image data including a plurality of color values, the plurality of color values being in one-to-one correspondence to the plurality of colors,
wherein the controller determines that the one of the leading edge and the trailing edge reaches the reading position when each of the plurality of currently acquired color values is changed from the corresponding one of previously acquired color value.

10. The image reading apparatus according to claim 9, wherein the second data is generated based on at least part of light emitted from the light emitting unit and reflected by the opposing member.

11. A non-transitory computer-readable storage medium storing computer-readable instructions that, when executed by a controller, causes an image reading apparatus that comprises: a conveying unit configured to convey an original document toward a reading position on a conveying path, the original document including a leading edge and a trailing edge; an image reading unit having a reading region, and configured to perform a reading operation while conveying the original document to generate image data representing an image corresponding to the reading region, the reading region extending in a main scanning direction and being positioned at the reading position, the reading region including a first region and a second region adjacent to the first region, the image data including first data and second data, the first data representing an image corresponding to the first region, the second data representing an image corresponding to the second region, the original document passing through the first region and not passing through the second region; an opposing member opposing the image reading unit and extending over the reading region, the original document passing a space between the image reading unit and the opposing member; and a displacing unit configured to displace the opposing member farther away from the image reading unit when the original document is present in the reading region than a position of the opposing member when the original document is not present in the reading region, to perform
executing the reading operation while conveying the original document and generating image data representing an image defined by the reading region; and
determining that one of the leading edge and the trailing edge reaches the reading position when the second data satisfies a prescribed condition.

* * * * *